(12) United States Patent
Abel et al.

(10) Patent No.: US 9,703,127 B2
(45) Date of Patent: *Jul. 11, 2017

(54) WAVEGUIDE STRUCTURE

(71) Applicant: International Business Machines Corporation, Armonk, NY (US)

(72) Inventors: Stefan Abel, Rueschlikon (CH); Chiara Marchiori, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,404

(22) Filed: Aug. 10, 2016

(65) Prior Publication Data

US 2016/0349546 A1 Dec. 1, 2016

Related U.S. Application Data

(63) Continuation of application No. 14/694,094, filed on Apr. 23, 2015, now Pat. No. 9,417,469.

(30) Foreign Application Priority Data

Apr. 24, 2014 (GB) .................................. 1407260.7

(51) Int. Cl.
G02F 1/035 (2006.01)
G02F 1/025 (2006.01)
G02F 1/03 (2006.01)

(52) U.S. Cl.
CPC .............. G02F 1/035 (2013.01); G02F 1/025 (2013.01); G02F 1/0316 (2013.01); G02F 2202/103 (2013.01); G02F 2203/06 (2013.01)

(58) Field of Classification Search
None
See application file for complete search history.

(56) References Cited

U.S. PATENT DOCUMENTS 6,393,185 B1 * 5/2002 Deacon .............. G02B 6/12004
385/12
7,082,237 B2 * 7/2006 Walker .................. G02F 1/2257
385/1

(Continued)

FOREIGN PATENT DOCUMENTS

EP 1271220 8/2009
WO WO2014/083195 A1 6/2014

OTHER PUBLICATIONS

Abel, S. et al., "A strong electro-optically active lead-free ferroelectric integrated on silicon," Nature Communications 4, Article No. 1671, published Apr. 9, 2013.

(Continued)

*Primary Examiner* — Sung Park
*Assistant Examiner* — Hoang Tran
(74) *Attorney, Agent, or Firm* — Scully, Scott, Murphy & Presser, P.C.; Keivan Razavi (57) ABSTRACT

A method comprising: providing a core comprising a layer of electro-optic dielectric material, a first layer of semiconductor material provided below the electro-optic material and a second layer of the semiconductor material provided above the electro-optic material, and electrodes, configured for applying voltages. The electro-optic dielectric material has a Pockels tensor containing at least one non-vanishing element rij where i≠j, and the electrodes comprise a first set of electrodes provided substantially in direct contact with the electro-optic dielectric material, and a second set of electrodes comprising at least an electrode provided substantially in direct contact with the first layer and at least an electrode substantially in direct contact with the second layer, wherein the sets of electrodes are configurable to apply in the electro-optic material, at least a substantially horizontal electrical field and at least a substantially vertical (Continued)

electrical field that are orientated substantially perpendicular relative to each other.

13 Claims, 3 Drawing Sheets

(56) References Cited

U.S. PATENT DOCUMENTS

| | | |
|---|---|---|
| 7,224,869 B2 | 5/2007 | Cole et al. |
| 7,224,878 B1 | 5/2007 | Wessels et al. |
| 8,244,076 B2 | 8/2012 | Heaton |
| 8,873,895 B2 * | 10/2014 | Fujikata ................. G02F 1/025 385/1 |
| 2004/0114208 A1 | 6/2004 | Balsamo et al. |
| 2010/0002994 A1 | 1/2010 | Baehr-Jones et al. |
| 2010/0021124 A1 * | 1/2010 | Koos ....................... G02F 1/011 385/141 |
| 2010/0111303 A1 * | 5/2010 | Finlayson ............. G02F 1/0136 380/256 |
| 2012/0148183 A1 | 6/2012 | Heaton |
| 2013/0188902 A1 * | 7/2013 | Gardes .................... G02F 1/025 385/2 |
| 2015/0049978 A1 * | 2/2015 | Fujikata ................. G02F 1/025 385/3 |

OTHER PUBLICATIONS

Hiltunen, J. et al., "BaTiO3—SrTiO3 multilayer thin film electro-optic waveguide modulator," Applied Physics Letter vol. 89, published Dec. 12, 2006.

List of IBM Patents or Patent Applications Treated as Related, dated Aug. 10, 2016, 2 pages.

* cited by examiner

WAVEGUIDE STRUCTURE

CROSS-REFERENCE TO RELATED APPLICATIONS

This application is based on and claims the benefit of priority from commonly-owned United Kingdom Patent Application 1407260.7, filed on Apr. 24, 2014. This application is a continuation of U.S. patent application Ser. No. 14/694,094, filed on Apr. 23, 2015.

FIELD OF THE INVENTION

The present invention relates to a waveguide structure and also extends to a method of fabricating such a waveguide structure.

BACKGROUND OF THE INVENTION

For the integration of photonic circuits/structures into silicon, several building blocks such as modulators, waveguides and detectors are needed. In order to link the electrical domain and the optical domain, devices such as electro-optic modulators need to be developed. In the field of telecommunication, electro-optic materials such as lithium niobate have been used to modulate light at relatively lower power and higher speed. This mature technology has not yet been applicable in silicon-based photonics as silicon does not inherently show any linear electro-optic effect. Also, electro-optic materials that may be integrated into silicon-based photonic structures without the need for specific processing techniques, such as, for example, spin-coating, and/or that may be compatible for the mass fabrication of such devices are not yet generally available. The use of plasma dispersion effects in silicon may alleviate some of the issues limiting silicon-based photonics since materials in addition to silicon may not be needed. However, the exploitation of such effects does not enhance the performance of silicon-based photonic modulators to the extent possible with modulators based on electro-optic materials, which provide an increased bandwidth by facilitating higher order modulation schemes.

It is known that electro-optic active materials can be integrated in waveguide structures that are then used to fabricate electro-optical modulators or switches, such as ring resonators and Mach-Zehnder modulators. An electro-optic active material is a material whose refractive index can be varied by applying an electrical field to this material, such an electrical field hereinafter being referred to as the modulating electrical field. Varying the refractive index of the electro-optic active material via the modulating electrical field can be used to affect the passage of an optical signal/light traversing through the electro-optic active material. The electro-optic effect of an electro-optic active material may depend on certain factors such as crystal orientation, the electrical fields that are applied to the electro-optic active material and also the orientation of light with respect thereto. The extent to which the variation of the refractive index occurs for a given modulating electrical field comprises the electro-optic response of an electro-optic active material.

In respect of electro-optic active materials, it is known that barium titanate has a relatively large associated electro-optic effect and so would be desirable for the basis of an optical modulator. A poling electrical field is applied to barium titanate to align/pole its ferroelectric domains. This is done to be able to record a macroscopic change in the refractive index of the barium titanate when a modulating electrical field is applied thereto. The electro-optic response of barium titanate is increased when the modulating electrical field and poling electrical field are orientated substantially perpendicular with respect to each other.

Reference is now made to US2010/0111303A1 which describes an electro-optic waveguide polarisation modulator comprising a waveguide core having first and second faces defining a waveguide core plane, a plurality of primary electrodes arranged at a first side of the waveguide core plane and out of said plane, and at least one secondary electrode arranged at a second side of the waveguide core plane and out of said plane, wherein the electrodes are adapted in use to provide an electric field having field components in two substantially perpendicular directions within the waveguide core so as to modulate the refractive index thereof such that electromagnetic radiation propagating through the core is converted from a first polarisation state to a second polarisation state. This document discloses a wave-guide core and cladding provided on the core, which separates the core from two top electrodes. The voltages applied to the two top electrodes are used to facilitate an electrical field having a horizontal field component and a vertical field component in the core, which are described as being perpendicular to each other. Consideration is now made as to whether the described configuration would be suitable for when the core comprises high-permittivity and/or electro-optic active materials, such as, for example, barium titanate. Even though the electrical field components may be perpendicular to each other in the present configuration, it is unlikely that the horizontal field component is present at the edges of the core. So, in respect of the core comprising barium titanate, there would be no poling electrical field at the edges of the core and so ferroelectric polarisation of the barium titanate in these regions is unlikely. Furthermore, a relatively large voltage drop occurs in the cladding for voltages applied to the two top electrodes and so the horizontal and/or vertical electrical field components may have relatively low associated field strengths in the core. Thus, the effectiveness of the poling field and/or the modulating electrical field in the electro-optic active material when it comprises barium titanate is expected to be reduced as is its associated electro-optic response.

Turning to U.S. Pat. No. 4,691,984, this document discloses a wavelength-independent electro-optical polarisation mode converter comprising: an electro-optical crystal substrate cut in a plane defined by a direction perpendicular to the optical axis of the crystal; an optical waveguide formed by diffusion of material into a surface of the substrate, the waveguide being oriented to provide for the propagation of light from one end to the other, in a direction parallel with the optical axis of the substrate; and electrode means disposed on the surface of the substrate and positioned with respect to the waveguide to provide control of a coupling coefficient for conversion between one polarisation mode and another, and control of the relative phase between the two modes; whereby both modes experience the same material refractive index, and any phase mismatch between the modes can be corrected by applying a suitable bias voltage through the electrode means. This document discloses a waveguide in which three top electrodes are formed on a waveguide core comprising a lithium niobate layer. A cladding layer is provided between the three top electrodes and the waveguide core. The three top electrodes are configurable to apply a horizontal electrical field and vertical electrical field in the lithium niobate. Because a relatively large voltage drop is likely to occur in the cladding layer when respective voltages are applied to the three top electrodes, the horizontal and/or vertical electrical fields produced in the waveguide core by such voltage application are expected to be of lower field strength, specifically in the lithium niobate layer. Also, a ground electrode is absent in the present configuration so field leakage may occur and particularly the vertical electrical field strength may be further reduced. In respect of if the waveguide core of the present configuration were to comprise barium titanate, the above-discussed factors may cause a reduced efficiency with which it may be poled and/or its refractive index modulated and, therefore, an overall reduced electro-optic response is to be expected.

The document titled, "Low power Mach-Zehnder modulator in silicon-organic hybrid technology", by Palmer et al. published in IEEE photonics technology letters, vol. 25, no. 13, Jul. 1, 2013, discloses a silicon-organic hybrid modulator based on a Mach-Zehnder interferometer. The device consists of a strip-loaded slot waveguide covered with an electro-optic polymer cladding. This document discloses a slot wave-guide modulator in which a vertical slot filled with electro-optic active materials is provided between silicon block electrodes. A single electrical field in a single direction is disclosed, there is no perpendicular field component. This may pose a limitation for the use of this configuration in a waveguide structure with a core in which the electro-optic active material is, for example, barium titanate, since it cannot be poled perpendicularly with respect to the modulating electrical field and so a reduced electro-optic response is likely.

The document titled, "AlGaAs—GaAs polarisation converter with electro-optic phase mismatch control", by Grossard et al. published in IEEE photonics technology letters, vol. 13, no. 8, August, 2001, discloses an electro-optic transverse magnetic-transverse electric mode converter with phase mismatch control integrated in AlGaAs—GaAs. Voltages applied to the three electrodes facilitate respective horizontal and vertical electrical fields in the AlGaAs—GaAs layer. This configuration may not be suitable for implementing a waveguide structure in which the core comprises high permittivity and/or electro-optic active materials such as, for example, barium titanate. A relatively large voltage drop is likely to occur in the cladding layer between the three electrodes and the core when respective voltages are applied to the three electrodes. So, it is likely that the horizontal and vertical electrical fields produced in the core by such voltage application are of lower field strength. Furthermore, in the absence of a ground electrode in the present configuration, the vertical electrical field strength is likely to be reduced. In combination, these factors may contribute to a reduced electro-optic response of this configuration.

In the document titled, "A review of lithium niobate modulators for fiber-optic communications systems", by Wooten et al. published in IEEE journal of selected topics in quantum electronics, vol. 6, issue 1, January-February 2000, a status of the lithium niobate external modulator technology is reviewed. Other waveguide structures and electro-optic device/material technology have been disclosed in patent documents US2012/0148183A1, U.S. Pat. No. 7,224,878B1, EP1271220B1, U.S. Pat. No. 7,224,869B2, U.S. Pat. No. 8,244,076B2, US2004/0114208A1 and in the documents titled, "A strong electro-optically active lead-free ferroelectric integrated on silicon" by Abel et al. published in Nature communications 4, Article no. 1671, April 2013, and "BaTiO3-SrTiO3 multilayer thin film electro-optic waveguide modulator", by Abel et al. published in Applied Physics Letters, vol. 89, issue 24, December 2006.

Accordingly, it is a challenge to provide a waveguide structure, forming the basis of a silicon-based photonics structure, with an integrated electro-optic active material, that mitigates and/or obviates the drawbacks associated with previously-proposed waveguide structures.

SUMMARY OF THE INVENTION

According to an embodiment of a first aspect of the present invention, there is provided a waveguide structure comprising: a core comprising a layer of at least an electro-optic dielectric material, a layer of at least a semiconductor material provided below the electro-optic material and a layer of at least a semiconductor material provided above the electro-optic material, and electrodes that are configurable for voltage application, wherein: the electro-optic dielectric material has a Pockels tensor containing at least one non-vanishing element rij where i≠j, and the electrodes comprise respective sets of electrodes comprising a set of electrodes that are provided substantially in direct contact with the electro-optic dielectric material, and a further set of electrodes comprising at least an electrode provided substantially in direct contact with the semiconductor material below the electro-optic material and at least an electrode provided substantially in direct contact with the semiconductor material above the electro-optic material, wherein the respective sets of electrodes are configurable to apply in the electro-optic material, when the waveguide structure is in use, at least a substantially horizontal electrical field and at least a substantially vertical electrical field that are orientated substantially perpendicular relative to each other.

The electrode configuration in an embodiment of the present invention comprises respective sets of electrodes. A set of electrodes are provided substantially in direct contact with the electro-optic dielectric material. Also provided is a further set of electrodes of which at least an electrode is provided substantially in direct contact with the semiconductor material above the electro-optic material and at least an electrode that is provided substantially in direct contact with the semiconductor material below the electro-optic material. By way of the electrode configuration in an embodiment of the present invention, the horizontal electrical field and vertical electrical field are orientated substantially perpendicular to each other, which may facilitate an enhanced electro-optic effect and/or electro-optic response of the electro-optic material.

The electrode configuration according to an embodiment facilitates the application of a relatively higher horizontal electrical field and/or vertical electrical field to the electro-optic material compared to previously-proposed solutions. This may provide the advantage of a lower power consumption since the application of a given electrical field in the electro-optic material may be done by applying lower voltages to the sets of electrodes in an embodiment of the present invention compared to previously-proposed solutions.

In contrast to previously-proposed structures and/or devices, there is no cladding layer between the electrodes and the electro-optic material in an embodiment of the present invention. Thus, higher electrical field strengths of the horizontal electrical field and/or the vertical electrical field in the electro-optic material are expected. This feature may further enhance the electro-optic effect and/or electro-optic response of the electro-optic material in an embodiment of the present invention. This feature may also contribute to advantageously further reducing the power consumption of an embodiment of the present invention as discussed hereinabove. The absence of incorporating a cladding layer reduces the number of fabrication steps of an embodiment of the present invention compared to previously-proposed devices and/or structures.

An embodiment of the present invention may be suitable to form the basis of a silicon-based waveguide structure. In this regard, it may benefit from the mature fabrication and processing technology based on silicon. Because the electro-optic material may be integrated with ease and without the need for special processing steps and/or equipment, such as, for example, spin-coating, in an embodiment of the present invention, it may be capable of matching the performance capability of modulators/optical structures based on electro-optic materials in terms of bandwidth capacity by facilitating higher order modulation schemes and so outperform current silicon-based modulators.

Preferably, the horizontal electrical field and the vertical electrical field each facilitate a given corresponding effect in the electro-optic material. It is more efficient and effective to use each of the horizontal electrical field and the vertical electrical field to facilitate a given corresponding effect in the electro-optic material than using a single electrical field for the same purpose. Because the horizontal electrical and vertical electrical field can be independently controlled, this feature provides the advantage that the given corresponding effects, which consequently occur in the electro-optic material due to applying the horizontal electrical field and vertical electrical field thereto, may be facilitated in a desired manner.

Desirably, the horizontal electrical field and the vertical electrical field are configurable to interchangeably facilitate a given effect in the electro-optic material. This confers flexibility and versatility to an embodiment of the present invention and extends its use with electro-optic materials and/or applications where such a feature is desired.

Preferably, a given set of electrodes of the respective sets of electrodes are configurable to pole ferroelectric domains in the electro-optic material. This feature provides the advantage of increased suitability for the use of an embodiment of the present invention with electro-optic materials such as, for example, barium titanate. By exploiting the relatively large electro-optic effect of barium titanate, the voltage and/or power consumption requirements of existing silicon-based optical modulators may be lowered by a factor of >100 with an embodiment of the present invention.

Desirably, a given set of electrodes of the respective sets of electrodes are configurable to modify a refractive index of the electro-optic material. By voltage application to a given set of electrodes of the respective sets of electrodes, the refractive index of the electro-optic material may be modified by either a vertical electrical field or a horizontal electrical field in an embodiment of the present invention. This feature imparts the advantages of flexibility, ease of operation and control to an embodiment of the present invention.

Preferably, an embodiment of the present invention is configurable to modify at least one of the horizontal electrical field and the vertical electrical field in response to a given temperature variation. Such a correction/compensation feature may extend the versatility and performance of an embodiment of the present invention ahead of previously-proposed waveguide structures and/or devices.

Desirably, an embodiment of the present invention is configurable to modify at least one of the horizontal electrical field and the vertical electrical field in response to a given dimension deviation. Such a correction/compensation feature may further extend the versatility and performance of an embodiment of the present invention ahead of previously-proposed waveguide structures and/or devices.

Preferably, an embodiment of the present invention is configurable such that the horizontal electrical and the vertical electrical field are applied one of: simultaneously and consecutively to the electro-optic material. This feature extends the advantages of versatility and flexibility to an embodiment of the present invention and increasing its scope of use in an optical application/structure/device where such a feature may be desired.

Desirably, the respective sets of electrodes are provided on substantially a same plane relative to the electro-optic material. This feature may provide the advantage of ease of fabrication and/or integration of an embodiment of the present invention with respect to an optical device/system/structure such as, for example, a photonic structure.

Preferably, the electro-optic material exhibits a Kerr effect in the range of $1e^{-10}$ $m^2/V^2$ to $1e^{-25}$ $m^2/V^2$. The electro-optic material is chosen so as to have a dominant Pockels effect compared to its associated Kerr effect, this being desirable for certain applications for which an embodiment of the present invention may be suited for.

Desirably, an embodiment of the present invention comprises a slot waveguide structure. This structure may provide the advantage of relatively strong light confinement in the layer of electro-optic material.

Preferably, the electro-optic dielectric material comprises at least one of barium titanate and barium strontium titanate. In contrast to previously-proposed waveguide structures, an embodiment of the present invention is particularly suitable for use with electro-optic materials such as barium titanate and barium strontium titanate, which exhibit a large electro-optic effect compared to other electro-optic materials. In respect of barium titanate, and as discussed hereinabove, it displays the strongest electro-optic effect and/or electro-optic response when: a poling electrical field is applied to align its ferroelectric domains and the modulating electrical field that is applied to vary its refractive index is substantially perpendicular to the poling field. These conditions are all met in an embodiment of the present invention because the vertical electrical field and the horizontal electrical field, which may be used for poling the electro-optic material and modifying its refractive index, are orientated substantially perpendicularly relative to each other in the electro-optic material due to the electrode configuration feature of an embodiment of the present invention. This may facilitate lower power consumption and higher speed performance of an embodiment of the present invention compared to previously-proposed waveguide structures.

Desirably, at least one of the semiconductor materials provided above and below the electro-optic material comprises one of: a Group IV material, a Group III-V material, a crystalline material, a polycrystalline material and an amorphous material. In this way, the compatibility of an embodiment of the present invention with well-established, cost-effective and mass-fabrication processing techniques is increased.

Preferably, at least one of the semiconductor materials provided above and below the electro-optic material comprises amorphous silicon. This feature may confer the advantage of ease of integration of an embodiment of the present invention with silicon photonic devices and/or structures.

According to an embodiment of a second aspect of the present invention, there is provided an optical structure comprising at least a waveguide structure according to an embodiment of the first aspect of the present invention. A waveguide structure according to an embodiment of the first aspect of the present invention may also be used to enable active photonic devices and/or structures such as Mach Zehnder interferometers/modulators and ring resonators/switches. The advantageous properties and/or features of a waveguide structure according to an embodiment of the first aspect of the present invention are imparted to such photonic devices and/or structures.

A corresponding method aspect is also provided, and so, according to an embodiment of a third aspect of the present invention, there is provided a method for fabricating a waveguide structure comprising the steps of: providing a core comprising a layer of at least an electro-optic dielectric material, a layer of at least a semiconductor material below the electro-optic material and a layer of at least a semiconductor material above the electro-optic material, and providing electrodes that are configurable for voltage application, wherein: the electro-optic dielectric material is selected to have a Pockels tensor containing at least one non-vanishing element rij where i≠j, and the electrodes are provided as comprising respective sets of electrodes comprising a set of electrodes that are provided substantially in direct contact with the electro-optic dielectric material and a set of electrodes comprising at least an electrode that is provided substantially in direct contact with the semiconductor material provided below the electro-optic material and at least an electrode that is provided substantially in direct contact with the semiconductor material provided above the electro-optic material, wherein the respective sets of electrodes are configurable to apply in the electro-optic material, when the waveguide structure is in use, at least a substantially horizontal electrical field and at least a substantially vertical electrical field that are orientated substantially perpendicular relative to each other.

Features of one aspect may be applied to another aspect and vice versa. Any of the embodiments shown and/or described may be combined with each other. This is also possible for one or more features of the embodiments.

BRIEF DESCRIPTION OF THE DRAWINGS

Reference will now be made, by way of example, to the accompanying drawings, in which.

DETAILED DESCRIPTION OF THE PREFERRED EMBODIMENTS OF THE PRESENT INVENTION

Within the description, the same reference numerals or signs have been used to denote the same parts or the like.

Figure 1:
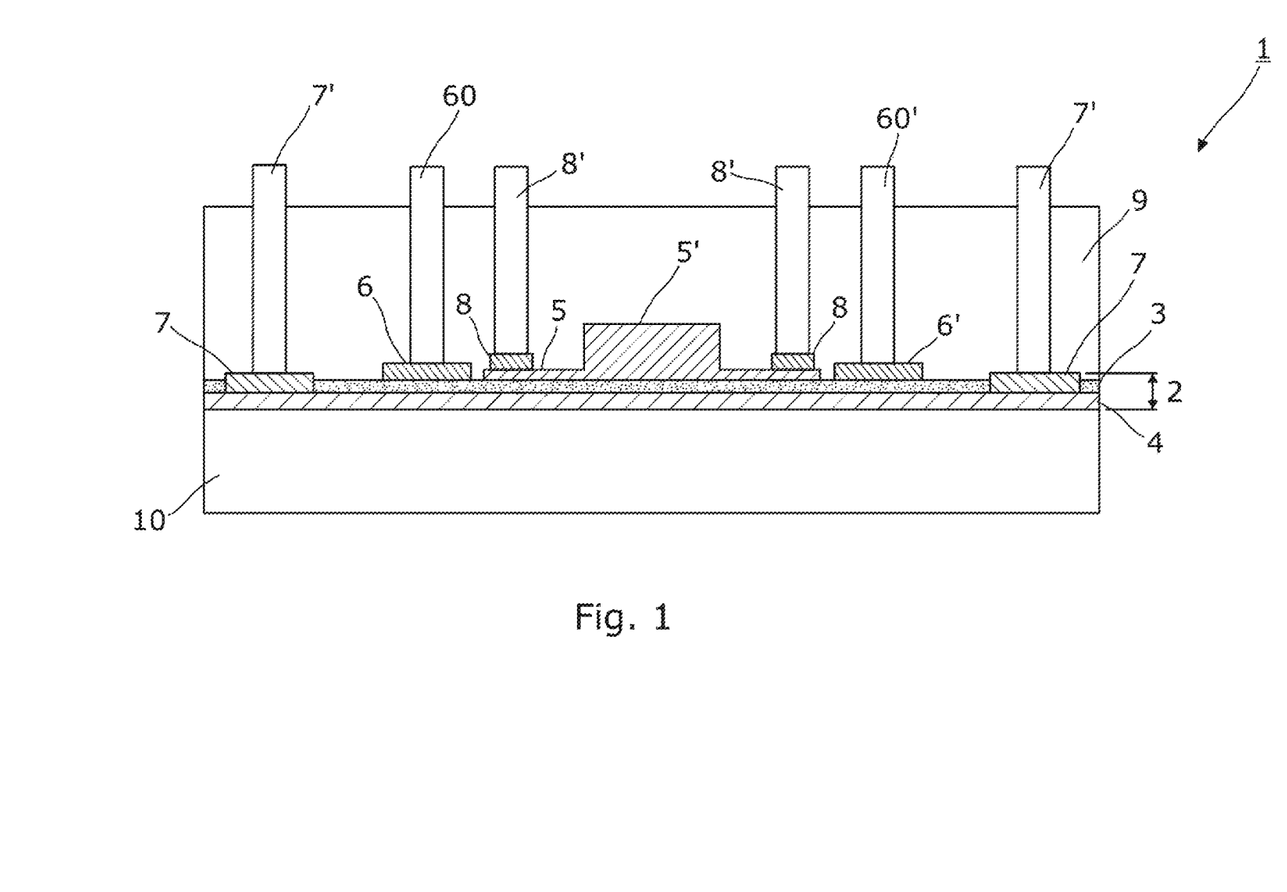
FIG. 1 schematically illustrates an embodiment of the present invention.

Reference is now made to FIG. 1 by way of which the layer/structural composition of the core 2 of a waveguide structure 1 according to an embodiment of the present invention is described. The core 2 comprises respective layers of an electro-optic dielectric material 3, a semiconductor material 4 provided below the electro-optic material 3 and a semiconductor material 5 provided above the electro-optic material 3. The semiconductor materials deposited below 4 and above 5 the electro-optic material 3 are chosen to each have a higher refractive index than the electro-optic material 3. A feature 5' is also provided in conjunction with the semiconductor layer 5 provided above the electro-optic material 3. It is created by processing the semiconductor layer 5 and is of the same material composition as semiconductor layer 5. Also provided are electrodes 6, 6', 7, 8, to which voltages can be applied via corresponding electrical terminals 60, 60', 7', 8'. The electro-optic dielectric material 3 is characterised in that it has a Pockels tensor containing at least one non-vanishing element rij where i≠j, and its largest Pockels coefficient is in the range of 0.01 to 100000 pm/V.

The electrode configuration in an embodiment of the present invention comprises respective sets of electrodes 6, 6', 7, 8. A set of electrodes 6, 6' is provided substantially in direct contact with the electro-optic dielectric material 3, such a set of electrodes being hereinafter referred to as the first set of electrodes. Another set of electrodes 7, 8 is also provided comprising at least an electrode 7 provided substantially in direct contact with the semiconductor material 4 below the electro-optic material 3 and at least an electrode 8 provided substantially in direct contact with the semiconductor material 5 above the electro-optic material 3, such a set of electrodes being hereinafter referred to as the second set of electrodes. In a preferred embodiment of the present invention and as can be clearly seen from FIG. 1, the second set of electrodes 7, 8 is implemented by a respective pair of metallic electrodes 7, 8 placed in direct contact with the semiconductor materials below 4 and above 5 the electro-optic material 3. In an embodiment of the present invention, the respective sets of electrodes 6, 6', 7, 8 are provided on substantially a same plane relative to the electro-optic material 3. In this regard, and with reference to FIG. 1, the respective sets of electrodes 6, 6', 7, 8 are provided relative to a top surface of the electro-optic material 3 onto which the semiconductor material 5 is deposited. The core 2 and the respective sets of electrodes 6, 6', 7, 8, are provided on a substrate 10 in an embodiment of the present invention.

With respect to a material composition of an embodiment of the present invention as shown in FIG. 1, the waveguide core 2 is provided on a substrate 10, which is preferably a buried oxide layer and comprises silicon dioxide. The electro-optic dielectric material 3 is chosen to comprise barium strontium titanate and most preferably barium titanate. At least one of the respective layers of semiconductor materials 4, 5 provided below and above the electro-optic material 3 is chosen to comprise one of a Group IV material, a Group III-V material, a crystalline material, a polycrystalline material and an amorphous material. In this regard, at least one of the layers of semiconductor materials 4, 5 provided below and above the electro-optic material 3 is chosen to comprise amorphous silicon. In an embodiment of the present invention, the semiconductor layers 4, 5 provided below and above the electro-optic material 3 may both comprise crystalline silicon or, alternatively, one of them may comprise crystalline silicon and the other may comprise amorphous silicon. A cladding 9 of silicon dioxide is also provided.

Figure 2A:
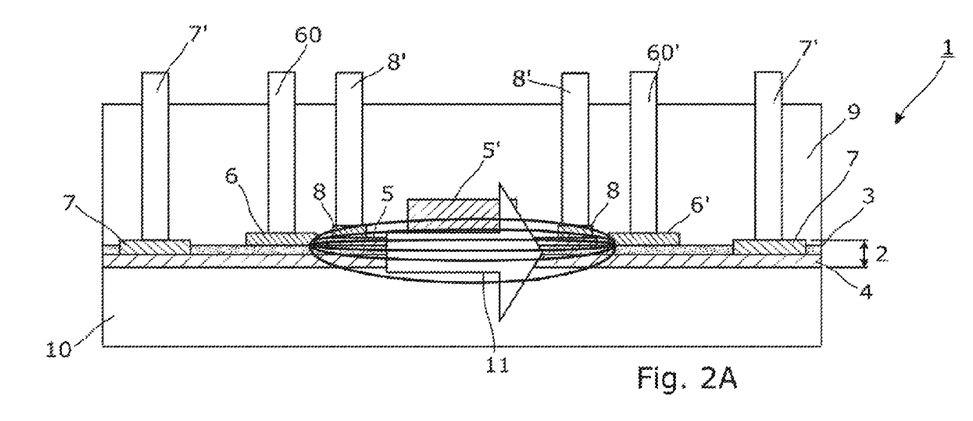
FIGS. 2a and 2b respectively schematically illustrate a horizontal electrical field and a vertical electrical field according to an embodiment of the present invention.
Figure 2B:
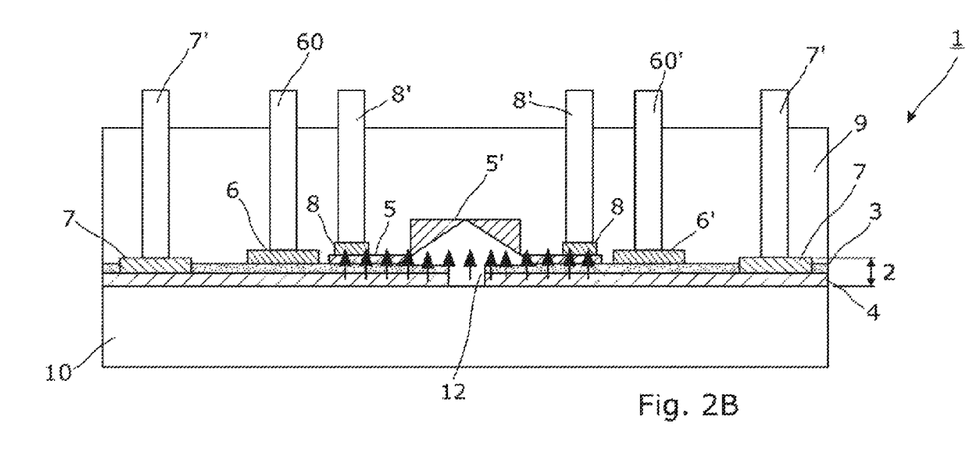

Reference is now made to FIGS. 2a and 2b, which respectively schematically illustrate a horizontal electrical field 11 and a vertical electrical field 12, each of which may be used to facilitate a given corresponding effect in the electro-optic material 3, in an embodiment of the present invention. This feature is of particular advantage in respect of the electro-optic material 3 in an embodiment of the present invention, which is chosen to have a Pockels tensor with at least one non-vanishing element rij where i≠j. This is because such a corresponding effect, which may be one of poling the electro-optic material and modulating its refractive index, may be facilitated in the non-diagonal directions of the crystal structure of the electro-optic material 3.

As can be clearly seen from FIGS. 2a and 2b, the horizontal electrical field 11 and the vertical electrical field 12 are respectively in-plane and out-of-plane relative to a surface of the electro-optic material 3 onto which the respective sets of electrodes 6, 6', 7, 8 are provided. Because of the electrode configuration 6, 6', 7, 8 feature of an embodiment of the present invention as hereinabove described, the horizontal electrical field 11 and the vertical electrical field 12 are orientated substantially perpendicular to each other in the electro-optic material 3.

Reference is now made to FIG. 2a in order to describe how the horizontal electrical field 11 is facilitated in an embodiment of the present invention. Applying respective voltages to the electrical terminals 60, 60' corresponding to the first set of electrodes 6, 6' causes a voltage drop to occur horizontally in the electro-optic material 3 spanning between the first set of electrodes 6, 6'. In this way, and as can be clearly seen from FIG. 2a, a horizontal electrical field 11 is homogeneously provided substantially in the full extent of the electro-optic material 3 of the waveguide core 2. Accordingly, the electrode configuration of an embodiment may facilitate the application of a relatively higher horizontal electrical field 11 to the electro-optic material 3 than previously-proposed solutions.

Reference is now made to FIG. 2b in order to describe how the vertical electrical field 12 is facilitated in an embodiment of the present invention. The electrodes 7, 8 of the second set of electrodes 7, 8 are implemented using metallic electrodes/pads contacting the respective layers of semiconductor materials 4, 5 provided below and above the electro-optic material 3. By way of this arrangement, the electrical potentials in the respective layers 4, 5 of semiconductor materials provided below and above the electro-optic material 3 are substantially the same as the electrical potentials in the metallic electrodes 7, 8 in contact thereto. The electrical potentials in the metallic electrodes 7, 8 are facilitated by the application of respective voltages to the electrical terminals 7', 8' corresponding thereto. Thus, the layers of semiconductor materials 4, 5 provided above and below the electro-optic material 3 perform as semiconducting electrodes and provide a continuation of the respective metallic electrodes 7, 8 in the regions where they respectively contact the electro-optic material 3. Application of respective voltages to the second set of electrodes 7, 8 causes a voltage drop vertically and substantially uniformly across the electro-optic material 3. In this way, the vertical electrical field 12 is applied to the electro-optic material 3 in an embodiment of the present invention. With respect to the layers of respective semiconductor material 4, 5 provided below and above the electro-optic material 3 performing as semiconducting electrodes, the layer of semiconductor material 4 provided below the electro-optic material 3 performs as a ground electrode and provides the advantage of reduced leakage of the vertical electrical field 12 in an embodiment of the present invention. Accordingly, the electrode configuration of an embodiment may facilitate the application of a relatively higher vertical electrical field 12 to the electro-optic material 3 than previously-proposed solutions. This feature may also further contribute to lowering the power consumption of an embodiment of the present invention as discussed hereinabove.

Other features of an embodiment of the present invention also facilitate a relatively higher horizontal electrical field 11 and/or vertical electrical field 12 to be applied to the electro-optic material 3. In this regard, and in contrast to previously-proposed solutions, there is no cladding layer 9 between the respective electrodes 6, 6', 7, 8 and the electro-optic material 3 in an embodiment of the present invention. Thus, higher electrical field strengths of the horizontal electrical field 11 and/or the vertical electrical field 12 are expected.

An embodiment of the present invention is configured in a slot waveguide structure, namely, a layer of the electro-optic material 3 is provided between two layers of semiconductor materials 4, 5. The electro-optic material 3 is chosen to have a lower refractive index than either of the semiconductor materials 4, 5 provided in relation thereto. This increases the confinement of light in the electro-optic material 3.

An embodiment of the present invention is particularly suited for use with barium titanate, which displays the strongest electro-optic effect and/or electro-optic response when: a poling electrical field is applied to align its ferroelectric domains and a modulating electrical field that is applied to vary its refractive index is substantially perpendicular to the poling field. These conditions are all met in a waveguide structure 1 because the horizontal electrical field 11 and the vertical electrical field 12 are orientated substantially perpendicularly relative to each other in the electro-optic material 3 due to the electrode configuration 6, 6', 7, 8 feature of an embodiment of the present invention. The horizontal electrical field 11 and the vertical electrical field 12 can each be applied to facilitate the given corresponding effects of poling the electro-optic material 3 and modifying its refractive index, which is more effective and efficient than using a single electrical field to achieve the same purposes, particularly for barium titanate with a large r42 coefficient. That the horizontal electrical field 11 and the vertical electrical field 12 may be interchangeably used for providing a given effect in the electro-optic material 3 is of particular advantage in an embodiment of the present invention. In this respect, the horizontal electrical field 11 and the vertical electrical field 12 may be interchangeably used for providing the respective effects of poling the electro-optic material 3 and modifying its refractive index when the crystalline orientation of the electro-optic material 3 determines whether poling thereof should be done via a horizontal electrical field 11 or vertical electrical field 12—this may be the case for when the electro-optic material 3 comprises barium titanate, for example. Where the horizontal electrical field 11 is used for poling the electro-optic material 3, and because it is substantially homogeneously provided in the waveguide core 2 in an embodiment of the present invention as can be ascertained from the discussion corresponding to FIG. 2a, the electro-optic material 3 may be poled more effectively and to a larger extent than in previously-proposed waveguide structures. So, the electro-optic effect and/or electro-optic response of the electro-optic material 3 in an embodiment of the present invention may be further enhanced compared to previously-proposed waveguide structures.

As mentioned hereinabove, the horizontal electrical 11 and the vertical electrical field 12 may be applied simultaneously or consecutively to the electro-optic material 3.

Where they are applied simultaneously and depending on their respective magnitudes, an arbitrary direction of an electrical field, which is essentially the sum of the horizontal electrical field 11 and the vertical electrical field 12, may be obtained in the electro-optic material 3 of the waveguide core 2. A non-horizontal/vertical electrical field affects different coefficients of the Pockels tensor and so this feature of an embodiment of the present invention may be used to advantage for certain materials and/or applications. Where the horizontal electrical field 11 and the vertical electrical field 12 are applied consecutively, one of them can be used to pole the electro-optic material 3 before operation of a modulator, for example, whilst the other is then modulated at high frequency during device operation.

An embodiment of the present invention is configurable to modify at least one of the horizontal electrical field 11 and the vertical electrical field 12 in response to a given temperature variation. The optical properties of photonic structures may be changed by the occurrence of temperature changes/drifts. The refractive index of electro-optic materials integrated in such photonic structures may be modified undesirably due to such temperature changes. In this regard, an embodiment of the present invention confers the advantage that a change in a given optical property, for example, a refractive index of the electro-optic material 3, due to a given temperature variation may be compensated for by modifying the horizontal electrical field 11 and/or the vertical electrical field 12 via voltage application to a given set of electrodes 6, 6', 7, 8 of the respective sets of electrodes 6, 6', 7, 8.

Another feature of an embodiment of the present invention is that it is configurable to modify at least one of the horizontal electrical field 11 and the vertical electrical field 12 in response to a given dimension deviation. In this regard, it is known that design targets may be deviated from during the fabrication of optical/photonic structures. Even relatively small deviations from given fabrication tolerances may significantly and, often undesirably, change the optical properties of such optical/photonic structures. In this respect, an embodiment of the present invention may confer the advantage of compensating for changes in given optical properties due to fabrication deviations by modifying at least one of the horizontal electrical field 11 and the vertical electrical field 12 via voltage application to a given set of electrodes 6, 6', 7, 8 of the respective sets of electrodes 6, 6', 7, 8. By way of example, a shift in the resonance wavelength of a photonic cavity occurs when the cavity length is even slightly off its associated design target. By modifying at least one of the horizontal electrical field 11 and the vertical electrical field 12 in an embodiment of the present invention, the refractive index of the electro-optic material 3 may be changed, thereby correcting for the change in the cavity length caused by the fabrication deviation. This feature extends the advantage of compensating and/or correcting for the effects of fabrication uncertainty encountered with respect to an embodiment of the present invention and/or any structure that it may integrated into.

Figure 3A:
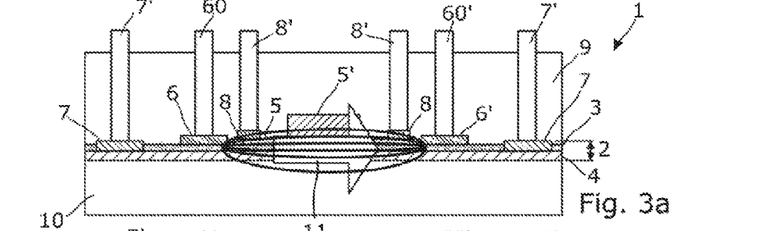
FIGS. 3a and 3b respectively schematically illustrate an embodiment of the present invention.
Figure 3B:
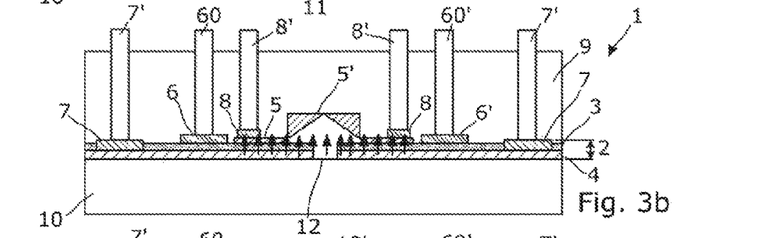
Figures 4A, 4B:
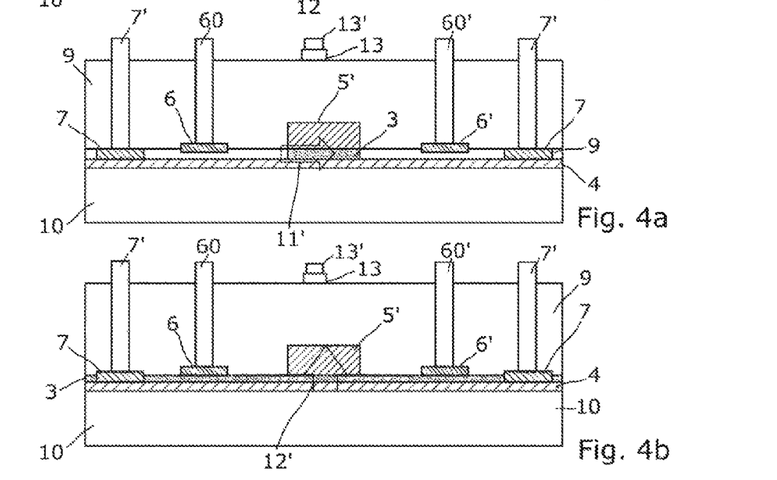
FIGS. 4a and 4b respectively schematically illustrate waveguide structures used for comparison with an embodiment of the present invention as shown in FIGS. 3a and 3b.

Reference is now made to FIGS. 4a and 4b that respectively schematically illustrate waveguide structures for comparison with an embodiment of the present invention as shown in FIGS. 3a and 3b. The waveguide structure shown in FIG. 4a differs from an embodiment of the present invention shown in FIGS. 3a and 3b in that its electrodes corresponding to the first set of electrodes 6, 6' in an embodiment of the present invention are provided on a cladding spacer 9 instead of an electro-optic material 3, the latter being provided as directly underlying feature 5' and above the semiconductor material indicated by reference numeral 4. Also, a top electrode 13 comprising a metallic pad with corresponding electrical terminal 13' is provided separated by cladding 9 from the rest of the structural features of the waveguide structure. Turning to the waveguide structure shown in FIG. 4b, it differs from that shown in FIG. 4a in that its electrodes 6, 6' corresponding to, and like, the first set of electrodes 6, 6' in an embodiment are provided on an electro-optic material 3 spanning the underlying semiconductor material 4 rather than a cladding spacer layer 9.

The material composition of the waveguide structure according to an embodiment of the present invention as shown in FIGS. 3a and 3b is as follows: the waveguide core 2 is provided on a substrate 10, which is preferably a buried oxide layer and comprises silicon dioxide; the electro-optic dielectric material 3 comprises barium titanate; the respective layers of semiconductor materials 4, 5 provided below and above the electro-optic material 3 are both chosen to comprise silicon; the cladding 9 comprises silicon dioxide and the respective sets of electrodes 6, 6', 7, 8 are implemented by way of metallic pads. Corresponding structural features of the comparison waveguide structures shown in FIGS. 4a and 4b and the waveguide structure according to an embodiment of the present invention shown in FIGS. 3a and 3b have the same material composition as described hereinabove.

Figure 5A:
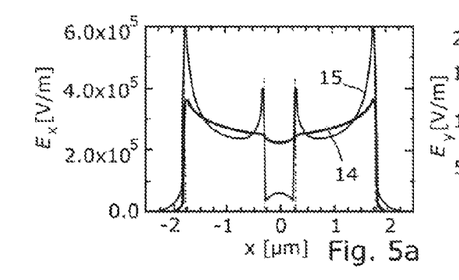
FIGS. 5a and 5b schematically illustrate quantitative calculations of the horizontal electrical field and vertical electrical field obtained with an embodiment of the present invention as shown in FIGS. 3a and 3b and the structures shown in FIGS. 4a and 4b.

In the waveguide structure of FIG. 3a, according to an embodiment of the present invention, a horizontal electrical field 11 is generated in the electro-optic material, barium titanate layer 3 by voltage application to the first set of electrodes 6, 6'. In the waveguide structure of FIG. 4a, a horizontal electrical field 11' is generated by voltage application to the electrodes thereof corresponding to the first set of electrodes 6, 6' in FIG. 3a. FIG. 5a schematically illustrates profiles 14, 15 of the respective horizontal electrical fields 11, 11' that are generated in the x-direction.

As can be clearly seen from FIG. 5a, the horizontal electrical field 11' depicted by profile 15 substantially in the electro-optic material, barium titanate layer 3 in the waveguide core, $-250$ nm$<x<250$ nm for the approximately 500 nm wide waveguide, is of a significantly lower magnitude for the comparison waveguide structure of FIG. 4a compared to the horizontal electrical field 11 depicted by profile 14 generated with the waveguide structure 1 according to an embodiment of the present invention as shown in FIG. 3a. This is particularly evident in the region of the centre of the respective waveguide structures, underlying feature 5'. Such an observation in respect of the comparison waveguide structure of FIG. 4a may be attributed to the cladding spacer layer 9 underlying the electrodes used in the generation of the horizontal electrical field 11' rather than the electro-optic material, barium titanate layer 3 as is the case in an embodiment of the present invention as shown in FIG. 3a.

Figure 5B:
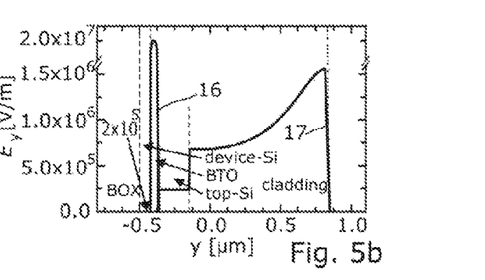

In the waveguide structure of FIG. 3b, according to an embodiment of the present invention, a vertical electrical field 12 is generated in the electro-optic material 3 comprising barium titanate by voltage application to the pairs of electrodes of the second set of electrodes 7, 8 as has already been described hereinabove. In the comparison waveguide structure of FIG. 4b, a vertical electrical field 12' is generated by voltage application to the pair of out-of-plane electrodes 7, which are provided in contact with the silicon layer 4 deposited below the electro-optic material, barium titanate layer 3, and to the top electrode 13. FIG. 5b schematically illustrates profiles 16, 17 of the respective vertical electrical fields 12, 12' that are generated.

In respect of the comparison waveguide structure of FIG. 4b, a relatively large drop of the vertical field 12' occurs in the cladding 9 below the top electrode 13, which separates it from the other structural features of the comparison waveguide structure, and is accordingly reduced in the electro-optic material, barium titanate layer 3. With reference to the waveguide structure 1 according to an embodiment of the present invention as shown in FIG. 3b, and in the absence of a cladding spacer 9 between the second set of electrodes 7, 8 and the electro-optic, barium titanate layer 3, the magnitude of the vertical electrical field 12 in the electro-optic, barium titanate layer 3 is higher than what is obtained with the comparison waveguide structure of FIG. 4b. Accordingly, the comparison waveguide structure of FIG. 4b has a lower associated electro-optic response, which would lead to higher power consumption than in the case of the waveguide structure 1 embodying the present invention and as shown in FIG. 3b.

From FIG. 5b, it can be seen from profile 16 that the vertical electrical field 12 in a waveguide structure 1 according to an embodiment of the present invention as shown in FIG. 3b begins to increase at the interface between the buried oxide substrate layer 10 and the silicon layer 4 provided below the electro-optic, barium titanate layer 3, corresponding to y=−500 nm in FIG. 5b. The vertical electrical field 12 is of highest magnitude in the electro-optic, barium titanate layer 3 between its respective interfaces with the silicon layers provided below 4 and above 5 in relation thereto. In contrast, and referring to profile 17, the magnitude of the vertical electrical field 12' generated by the comparison waveguide structure of FIG. 4b is much smaller in the electro-optic, barium titanate layer 3 in such corresponding regions.

An embodiment of the present invention is not restricted to the electro-optic material 3 comprising barium titanate. Any other suitable electro-optic material, which has a high-permittivity and/or in which the application of a horizontal electrical field 11 and a vertical electrical field 12 that are orientated substantially perpendicular to each other is desired may be used.

The second set of electrodes 7, 8 provided on the respective semiconductor materials 4, 5 below and above the electro-optic material 3 are not restricted to an arrangement of pairs of electrodes 7, 8 symmetrically provided relative to the waveguide centre. A scenario where an electrode 7, 8 is provided on each of the semiconductor materials 4, 5 deposited below and above the electro-optic material 3 is also encompassed within the scope of an embodiment of the present invention.

Regarding the electrode arrangement in an embodiment of the present invention, the order of the electrodes from the waveguide core 2 to the sides of the waveguide 1 may be interchanged. For example, the metallic electrodes 7 contacting the semiconductor material 4 deposited under the electro-optic material 3 may be placed closer to the waveguide core 2 than the first set of electrodes 6, 6'.

The present invention has been described purely by way of example and modifications of detail can be made within the scope of the invention.

Each feature disclosed in the description, and where appropriate, the claims and the drawings may be provided independently or in any appropriate combination.

The invention claimed is:

1. A method for fabricating a waveguide structure (1) comprising the steps of: providing a core (2) comprising a layer of at least an electro-optic dielectric material (3), a layer of at least a semiconductor material (4) below the electro-optic material (3) and a layer of at least a semiconductor material (5) above the electro-optic material (3), and providing electrodes (6, 6', 7, 8) that are configurable for voltage application, wherein: the electro-optic dielectric material (3) is selected to have a Pockels tensor containing at least one non-vanishing element $r_{ij}$ where i≠j and the electrodes (6, 6', 7, 8) are provided as comprising respective sets of electrodes (6, 6', 7, 8) that comprise a set of electrodes (6) that are provided substantially in direct contact with the electro-optic dielectric material (3) and a set of electrodes (7, 8) comprising at least an electrode (7) that is provided substantially in direct contact with the semiconductor material (4) provided below the electro-optic material (3) and at least an electrode (8) that is provided substantially in direct contact with the semiconductor material (5) provided above the electro-optic material (3), wherein the respective sets of electrodes (6, 6', 7, 8) are configurable to apply in the electro-optic material (3), when the waveguide structure (1) is in use, at least a substantially horizontal electrical field (11) and at least a substantially vertical electrical field (12) that are orientated substantially perpendicular relative to each other, and wherein the horizontal electrical field (11) and the vertical electrical field (12) are each configurable to facilitate a given corresponding effect in the electro-optic material (3).

2. A method as claimed in claim 1, wherein the horizontal electrical field (11) and the vertical electrical field (12) are configurable to interchangeably facilitate a given effect in the electro-optic material (3).

3. A method as claimed in claim 1, wherein a given set of electrodes of the respective sets of electrodes (6, 6', 7, 8) are configurable to pole ferroelectric domains in the electro-optic material (3).

4. A method as claimed in claim 1, wherein a given set of electrodes of the respective sets of electrodes (6, 6', 7, 8) are configurable to modify a refractive index of the electro-optic material (3).

5. A method as claimed in claim 1, configurable to modify at least one of the horizontal electrical field (11) and the vertical electrical field (12) in response to a given temperature variation.

6. A method as claimed in claim 1, configurable to modify at least one of the horizontal electrical field (11) and the vertical electrical field (12) in response to a given dimension deviation.

7. A method as claimed in claim 1, configurable such that the horizontal electrical (11) and the vertical electrical field (12) are applied one of: simultaneously and consecutively to the electro-optic material (3).

8. A method as claimed in claim 1, wherein the respective sets of electrodes (6, 6', 7, 8) are provided on substantially a same plane relative to the electro-optic material (3).

9. A method as claimed in claim 1, wherein the electro-optic material (3) exhibits a Kerr effect in the range of $1e^{-10} m^2/V^2$ to $1e^{-25} m^2/V^2$.

10. A method as claimed in claim 1, comprising providing a slot waveguide structure (3, 4, 5, 5').

11. A method as claimed in claim 1, wherein the electro-optic dielectric material (3) comprises at least one of barium titanate and barium strontium titanate.

12. A method as claimed in claim 1, wherein at least one of the semiconductor materials (4, 5) provided above and below the electro-optic material (3) comprises one of: a Group IV material, a Group III-V material, a crystalline material, a polycrystalline material and an amorphous material.

13. A method as claimed in claim 1, wherein at least one of the semiconductor materials (4, 5) provided above and below the electro-optic material (3) comprises amorphous silicon.

* * * * *